United States Patent

Goldenberg

(10) Patent No.: US 12,511,731 B2
(45) Date of Patent: Dec. 30, 2025

(54) SYSTEM AND METHOD FOR THREE-DIMENSIONAL IMAGING OF SAMPLES USING A MACHINE LEARNING ALGORITHM

(71) Applicant: Orbotech Ltd., Yavne (IL)

(72) Inventor: Chay Goldenberg, Tel-Aviv (IL)

(73) Assignee: Orbotech Ltd., Yavne (IL)

( * ) Notice: Subject to any disclaimer, the term of this patent is extended or adjusted under 35 U.S.C. 154(b) by 448 days.

(21) Appl. No.: 18/195,098

(22) Filed: May 9, 2023

(65) Prior Publication Data

US 2024/0378716 A1 Nov. 14, 2024

(51) Int. Cl.
*G06T 7/00* (2017.01)
*G01N 21/956* (2006.01)
(Continued)

(52) U.S. Cl.
CPC .......... *G06T 7/001* (2013.01); *G01N 21/956* (2013.01); *G06T 7/50* (2017.01); *H04N 23/56* (2023.01); *G01N 2021/95638* (2013.01); *G01N 2201/0666* (2013.01); *G01N 2201/126* (2013.01); *G06T 2200/04* (2013.01); *G06T 2207/20081* (2013.01); *G06T 2207/30141* (2013.01)

(58) Field of Classification Search
None
See application file for complete search history.

(56) References Cited

U.S. PATENT DOCUMENTS 8,290,239 B2   10/2012   Noy et al.
10,839,506 B1 *   11/2020   Raghu .................. G06T 7/0004
(Continued)

FOREIGN PATENT DOCUMENTS

CA   3146753 A1 *   2/2021   .......... H04N 23/698
CN   102314683 B   1/2013
(Continued)

OTHER PUBLICATIONS

Baygin et al., "Machine Vision based Defect Detection Approach using Image Processing," 2017 International Artificial Intelligence and Data Processing Symposium (IDAP), 2017, 5 pages.
(Continued)

*Primary Examiner* — Ricky Chin
(74) *Attorney, Agent, or Firm* — Suiter Swantz IP

(57) ABSTRACT

A method for 3D imaging of samples using a machine learning algorithm is disclosed. The method uses multimodality focal stacks, which consist of a plurality of images acquired at two or more distances between the sample and a front focal plane, with at least one image acquired using the first modality and additional images acquired using additional modalities. The modalities may have different illumination angles and optionally different spectral distributions. The method may include receiving training images of samples, which include a plurality of training focal stacks, and ground truth 3D data (depth maps) for each training focal stack, and training a machine learning algorithm based on the training images and the ground truth data. The method subsequently receives product images of a sample, the product images including a focal stack from an optical assembly, and generates a 3D depth map.

25 Claims, 11 Drawing Sheets

(51) Int. Cl.
*G06T 7/50* (2017.01)
*H04N 23/56* (2023.01)

(56) References Cited

U.S. PATENT DOCUMENTS

| | | | | |
|---|---|---|---|---|
| 10,970,831 | B2* | 4/2021 | Putman | G06V 20/693 |
| 11,080,590 | B2 | 8/2021 | Smolyanskiy et al. | |
| 11,159,712 | B2* | 10/2021 | Wiseman | G06T 1/0007 |
| 2013/0037526 | A1 | 2/2013 | Noy et al. | |
| 2014/0086475 | A1 | 3/2014 | Daneshpanah et al. | |
| 2016/0360091 | A1 | 12/2016 | Lindskog et al. | |
| 2020/0302144 | A1* | 9/2020 | Leshem | G06V 20/647 |
| 2021/0073959 | A1* | 3/2021 | Elmalem | G06N 3/084 |
| 2021/0360140 | A1 | 11/2021 | Katzir et al. | |
| 2022/0043357 | A1* | 2/2022 | Young | G06T 7/0004 |
| 2022/0120664 | A1 | 4/2022 | Rognin et al. | |
| 2022/0121022 | A1* | 4/2022 | Wang | G02B 21/082 |
| 2024/0378716 | A1* | 11/2024 | Goldenberg | G06T 7/571 |

FOREIGN PATENT DOCUMENTS

| | | | | |
|---|---|---|---|---|
| CN | 116430571 A * | 7/2023 | | G02B 21/12 |
| EP | 4361944 A1 * | 5/2024 | | G06T 7/0012 |
| WO | WO-2012094523 A2 * | 7/2012 | | G01N 21/453 |
| WO | 2022013850 A1 | 1/2022 | | |

OTHER PUBLICATIONS

Chen et al., "Deep Photometric Stereo for Non-Lambertian Surfaces", IEEE Transactions on Pattern Analysis and Machine Intelligence, 2022, 13 pages.

Davies et al., "Photometric Stereo," Science Direct, 2005, 16 pages.

Hazirbas et al., "Deep Depth From Focus", Asian Conference on Computer Vision, Oct. 28, 2018, 23 pages, Technical University of Munich, Germany.

Lu et al., "A 3D Imaging Framework Based on High-Resolution Photometric-Stereo and Low-Resolution Depth," International Journal of Computer Vision, Nov. 9, 2012, 15 pages, vol. 102, Springer Science+Business Media New York.

Nehab et al., "Efficiently Combining Positions and Normals for Precise 3D Geometry", 8 pages, SIGGRAPH 2005.

Peng et al., "Depth Super-Resolution Meets Uncalibrated Photometric Stereo", In IEEE Conference on Computer Vision (ICCV) Workshop, Aug. 24, 2017, 8 pages.

Zhou et al., "Coded Aperture Pairs for Depth from Defocus," Dec. 3, 2010, 8 pages, 2009 IEEE 12th International Conference on Computer Vision.

Israel Patent Office, International Search Report and Written Opinion received in International Application No. PCT/IL2024/050306, May 30, 2024, 14 pages.

* cited by examiner

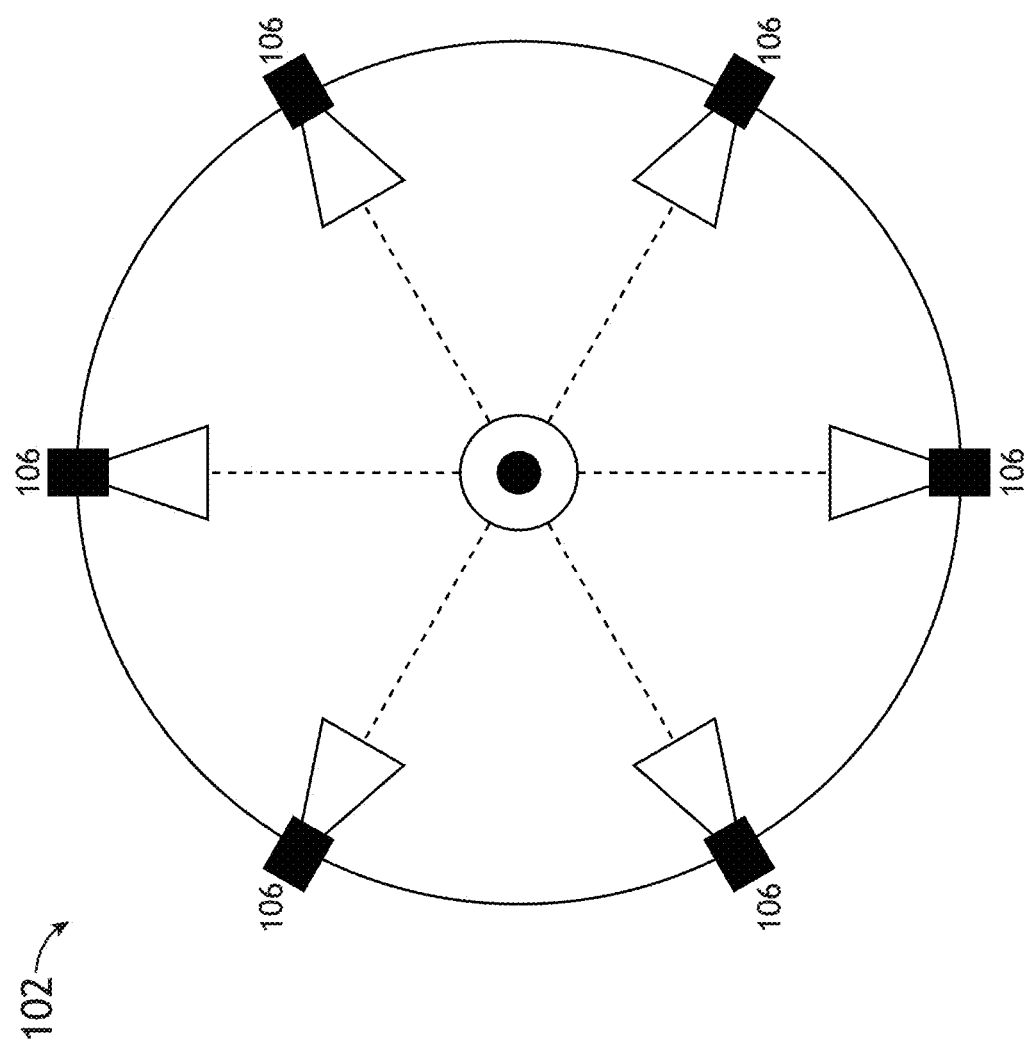

SYSTEM AND METHOD FOR THREE-DIMENSIONAL IMAGING OF SAMPLES USING A MACHINE LEARNING ALGORITHM

TECHNICAL FIELD

The present invention generally relates to three-dimensional (3D) imaging, and, more particularly, to a system and method for 3D imaging of samples based on multi-modality focal stacks, using a machine learning algorithm, where the machine learning algorithm is trained using the set of multi-modality focal stacks.

BACKGROUND

As the demand for electronic circuits having ever-smaller device features continues to increase, the need for improved 3D imaging techniques continues to grow. Optical inspection systems may require 3D imaging in order to measure features of circuits (e.g., conductors, drills, and the like) in three dimensions, and identify or validate "3D defects" (e.g., dishdowns, i.e., small areas of thinner copper). Optical shaping systems may be used in the printed circuit board fabrication process to increase yield and eliminate scrap. Such optical shaping systems may utilize 3D imaging when repairing defects. For example, 3D imaging may be used during the repair process when depositing copper onto the surface of the printed circuit board. By way of another example, 3D imaging may be used after the repair process to measure sample damage to ensure that when removing excess copper (e.g., using laser ablation), the laser did not inadvertently penetrate the laminate.

Current focus-based 3D imaging techniques are typically cost efficient, but provide limited spatial accuracy and precision compared to the imaging resolution since the determination of focus quality of an individual pixel requires calculations based on the neighborhood of each pixel. Other 3D imaging techniques, e.g., based on interferometry, are more costly and some may require additional optical components, which complicate the system and may reduce system throughput.

As such, it would be advantageous to provide a system and method to remedy the shortcomings of the approaches identified above.

SUMMARY

An optical system is disclosed, in accordance with one or more embodiments of the present disclosure. In embodiments, the optical system includes an optical assembly configured to illuminate one or more portions of a sample using two or more illumination modalities including at least a first illumination modality and a second illumination modality, where the first illumination modality includes a first set of illumination angles and the second illumination modality includes a second set of illumination angles, where at least the second set of illumination angles is at least partially different from the first set of illumination angles. In embodiments, the optical assembly is configured to acquire a multi-modality focal stack, the multi-modality focal stack a plurality of images acquired at two or more distances between the sample and a front focal, where at least a first image of the plurality of images is acquired using the first illumination modality and at least an additional image is acquired using the second illumination modality. In embodiments, the optical system further includes an image processing subsystem communicatively coupled to the optical assembly, where the image processing subsystem includes one or more processors configured to execute a set of program instructions stored in memory. In embodiments, the set of program instructions are configured to cause the one or more processors to receive a plurality of training images, where the one or more training images include a plurality of training multi-modality focal stacks. In embodiments, the set of program instructions are configured to cause the one or more processors to receive three-dimensional ground truth data for each training multi-modality focal stack of the plurality of training multi-modality focal stacks. In embodiments, the set of program instructions are configured to cause the one or more processors to train a machine learning algorithm based on the plurality of training images and the received three-dimensional ground truth data. In embodiments, the set of program instructions are configured to cause the one or more processors to receive the multi-modality focal stack of the sample from the optical assembly. In embodiments, the set of program instructions are configured to cause the one or more processors to generate a depth map of the sample using the trained machine learning algorithm and the received multi-modality focal stack.

An image processing system is disclosed, in accordance with one or more embodiments of the present disclosure. In embodiments, the system includes one or more processors configured to execute a set of program instructions stored in memory, In embodiments, the set of program instructions are configured to cause the one or more processors to receive a plurality of training images, where the one or more training images include a plurality of training multi-modality focal stacks. In embodiments, the set of program instructions are configured to cause the one or more processors to receive three-dimensional ground truth data for each training multi-modality focal stack of the plurality of training multi-modality focal stacks. In embodiments, the set of program instructions are configured to cause the one or more processors to train a machine learning algorithm based on the plurality of training images and the received three-dimensional ground truth data. In embodiments, the set of program instructions are configured to cause the one or more processors to receive the multi-modality focal stack of the sample from the optical assembly, where the optical assembly is configured to illuminate the one or more portions of the sample using two or more illumination modalities including at least a first illumination modality and a second illumination modality, where the first illumination modality includes a first set of illumination angles and the second illumination modality includes a second set of illumination angles, where at least the second set of illumination angles is at least partially different from the first set of illumination angles, where the multi-modality focal stack includes a plurality of images acquired at two or more distances between the sample and a front focal, where at least a first image of the plurality of images is acquired using the first illumination modality and at least an additional image is acquired using the second illumination modality. In embodiments, the set of program instructions are configured to cause the one or more processors to generate a depth map of the sample using the trained machine learning algorithm and the received multi-modality focal stack.

A method is disclosed, in accordance with one or more embodiments of the present disclosure. In embodiments, the method includes receiving a plurality of training images, where the one or more training images include a plurality of training multi-modality focal stacks. In embodiments, the method includes receiving three-dimensional ground truth data for each training multi-modality focal stack of the plurality of training multi-modality focal stacks. In embodiments, the method includes training a machine learning algorithm based on the plurality of training images and the received ground truth three-dimensional data. In embodiments, the method includes receiving the multi-modality focal stack of the sample from the optical assembly, where the optical assembly is configured to illuminate the one or more portions of the sample using two or more illumination modalities including at least a first illumination modality and a second illumination modality, where the first illumination modality includes a first set of illumination angles and the second illumination modality includes a second set of illumination angles, where at least the second set of illumination angles is at least partially different from the first set of illumination angles, where the multi-modality focal stack includes a plurality of images acquired at two or more distances between the sample and a front focal, where at least a first image of the plurality of images is acquired using the first illumination modality and at least an additional image is acquired using the second illumination modality. In embodiments, the method includes generating a depth map of the sample using the trained machine learning algorithm and the received multi-modality focal stack.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

FIG. 1B illustrates a simplified schematic top view of an optical assembly of the optical system, in accordance with one or more embodiments of the present disclosure.

DETAILED DESCRIPTION

Figure 1A:
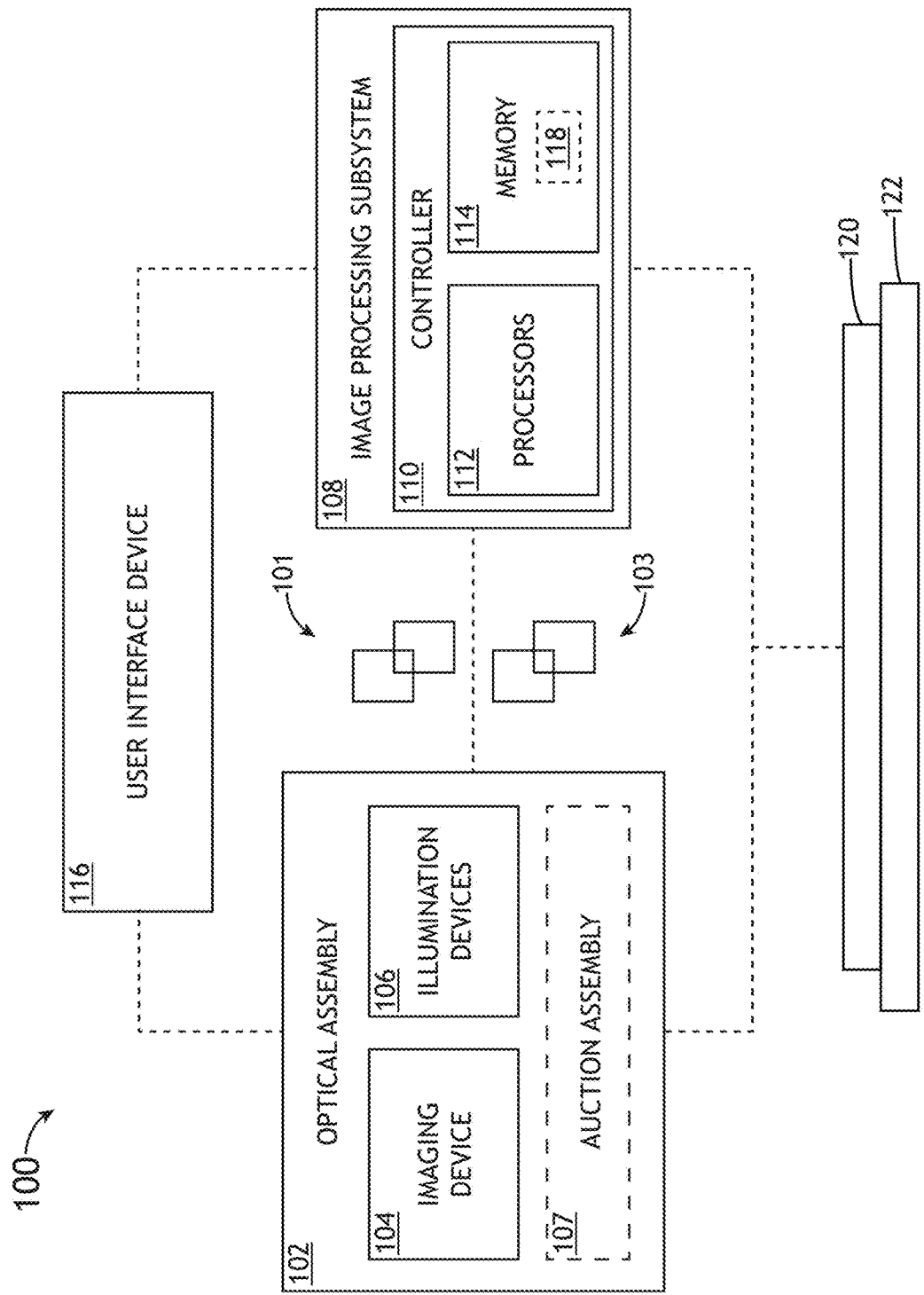
FIG. 1A illustrates a block diagram view of an optical system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

As the demand for electronic circuits having ever-smaller features and reduced thickness continues to increase, the need for improved 3D imaging techniques continues to grow. Optical inspection systems may be used in the printed circuit board fabrication process for process control and yield management. Such systems may utilize 3D imaging for identifying and/or verifying defects and for measuring features of circuits in 3D. Optical shaping systems may be used to eliminate scrap, increasing printed circuit board yield. Such systems may utilize 3D imaging when repairing defects. Optical shaping systems are generally discussed in U.S. Pat. No. 8,290,239, issued on Oct. 16, 2012, and U.S. Patent Publication No. 2013/0037526, published on Feb. 14, 2013, which are incorporated by reference in their entirety.

Current 3D imaging techniques using depth from focus (DFF) capture a single image at each object distance from the focal plane of an optical system. From such a set of images at different object distances, the DFF algorithm determines, for each imaged point in the object, the position at which the neighborhood of the point is at best focus. However, one disadvantage of "standard" DFF is that it provides limited spatial accuracy and precision compared to the imaging resolution, since the determination of focus quality of an individual pixel requires calculations based on the neighborhood of each pixel.

Other 3D imaging techniques, such as white light interferometry (WLI) techniques, as well as multi-view stereo and triangulation or phase shift methods, provide higher spatial accuracy and precision but are costly and require additional optical components. Further, other imaging techniques, such as photometric stereo (PS), are typically computationally intensive (and therefore time demanding) and also require detailed, accurate reflection models of the materials composing the imaged objects for obtaining an accurate surface reconstruction.

As such, it would be advantageous to provide a system and method to remedy the shortcomings of the approaches identified above.

Embodiments of the present disclosure are directed to a system and method for generating one or more depth maps of one or more portions of a sample by capturing a set of images at a set of distances between the sample and the front focal plane with at least two distinct illumination angles, and using a machine learning algorithm for obtaining a depth map from this data. For example, the system may include an optical assembly configured to acquire a set of images at a set of distances between the sample and the front focal plane with at least two distinct illumination angles. As previously noted herein, unlike "standard" DFF where a single image is taken at each distance from the object, the system of the present disclosure may acquire a multi-modality focal stack of a sample under different illumination modalities. In this regard, the system may acquire reflection information for each pixel on the sample under different illumination directions. Such information can be used to increase the spatial resolution, precision, and accuracy of the obtained depth map. For purposes of the present disclosure, "depth map" and variations thereof may be defined as data consisting of the depth value (z) as a function of position (x,y) in the perpendicular plane (e.g., at each of the imaging pixels).

As previously noted herein, unlike PS where a reflection model is needed, the system and method of the present disclosure do not rely on reflection models of the material, but rather use a machine learning approach to train the system on the type of samples to be imaged. Further, using a machine learning approach can reduce the number of images required for 3D reconstruction when generating the one or more depth maps.

Further, the system may include an image processing subsystem configured to use a machine learning algorithm trained using focal stacks with multiple illuminations and ground truth 3D data (e.g., obtained using WLI or other imaging techniques). Once trained, the machine learning algorithm may be configured to generate the one or more depth maps of the one or more portions of the sample based on the collected images from the optical assembly. In some embodiments, the machine learning algorithm may be configured to generate one or more depth maps of the one or more portions of the sample at depth resolutions between approximately 0.1-2 microns (μm).

FIG. 1A illustrates a simplified block diagram of an optical system 100, in accordance with one or more embodiments of the present disclosure. In particular, FIG. 1A illustrates a system 100 for generating depth maps of one or more portions of a sample using machine learning techniques.

In embodiments, the system 100 includes an optical assembly 102. The optical assembly may include, but is not limited to, one or more imaging devices 104, one or more illumination devices 106, one or more controllers including one or more processors and memory, a chassis, and the like.

The system 100 may additionally include an image processing subsystem 108 communicatively coupled to the optical assembly 102. The image processing subsystem 108 may include, but is not limited to, one or more controllers including one or more processors 112 and a memory 114.

The optical assembly 102 and/or the image processing subsystem 108 may be communicatively coupled to a user interface device 116.

Figure 1C:
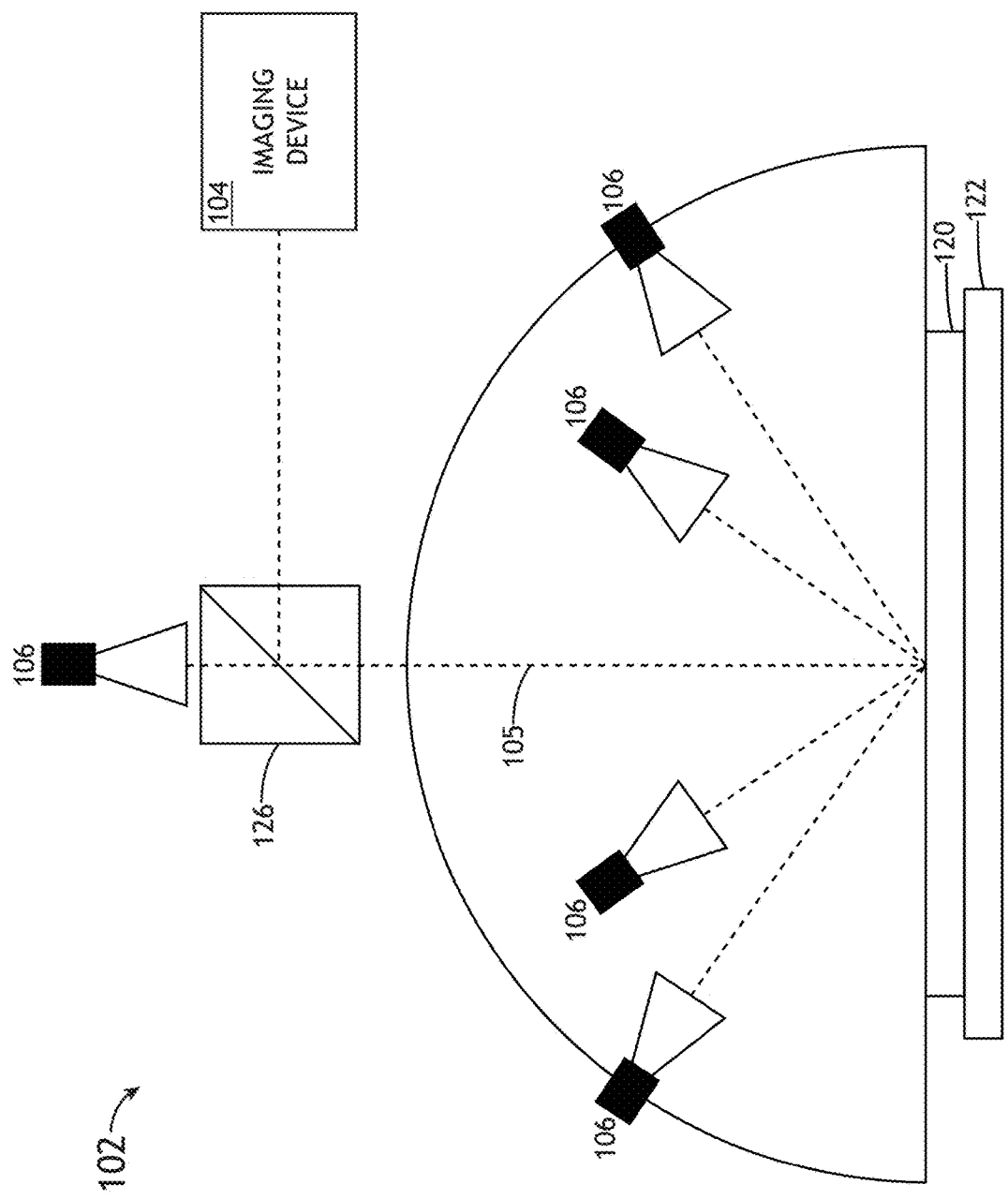
FIG. 1C illustrates a simplified schematic side view of the optical assembly of the optical system, in accordance with one or more embodiments of the present disclosure.
Figure 1D:
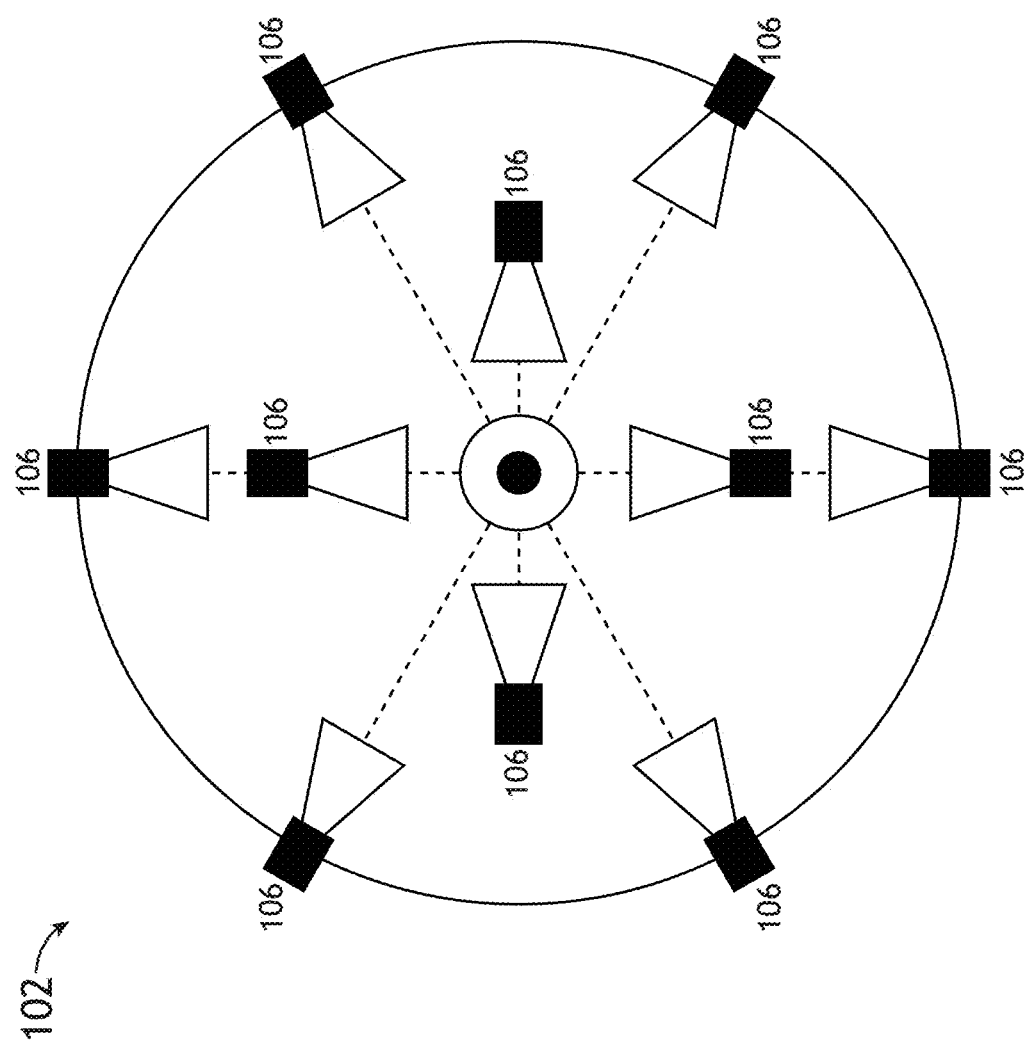
FIG. 1D illustrates a simplified schematic top view of an optical assembly of the optical system, in accordance with one or more embodiments of the present disclosure.
Figure 1E:
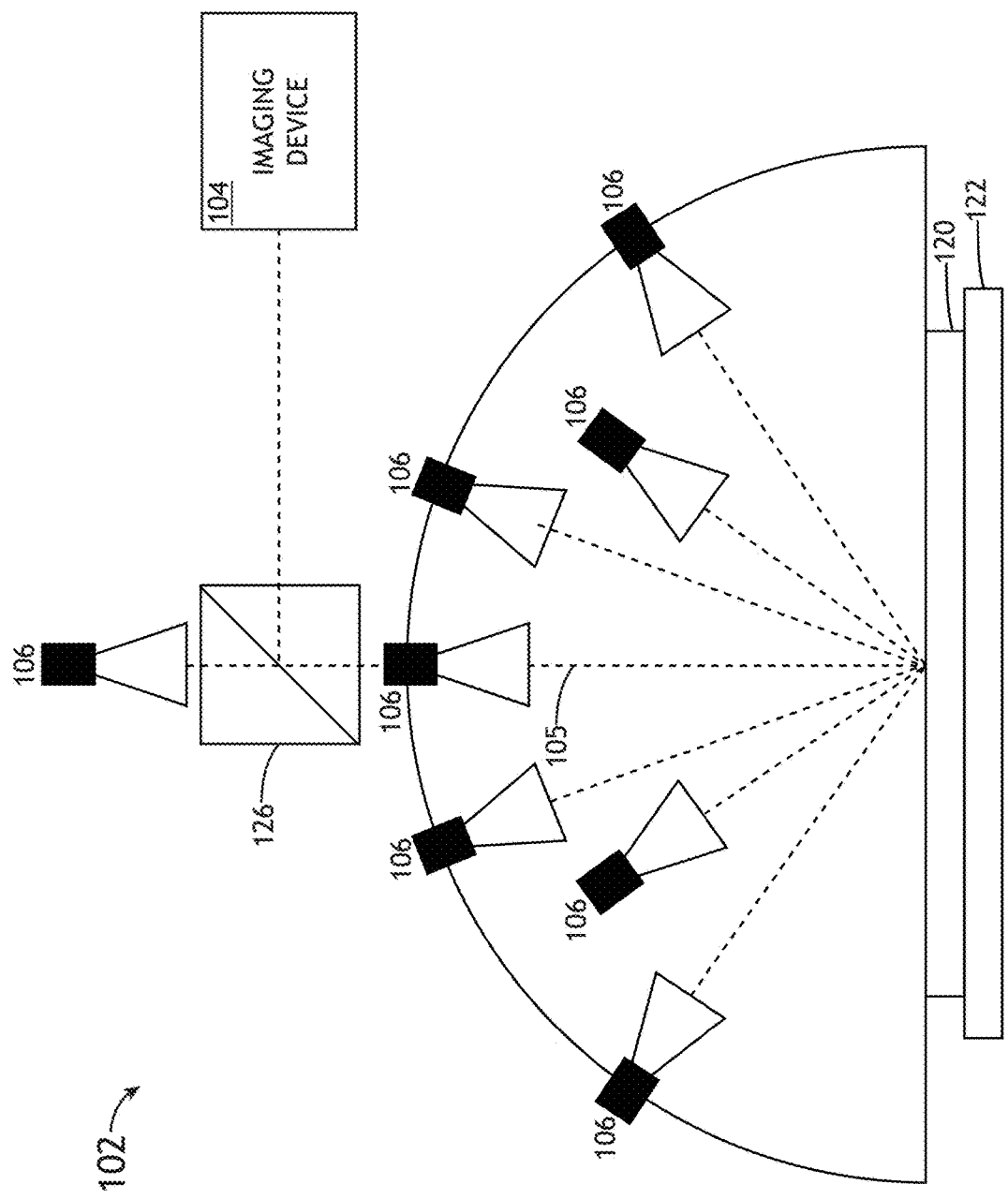
FIG. 1E illustrates a simplified schematic side view of the optical assembly of the optical system, in accordance with one or more embodiments of the present disclosure.

FIGS. 1B-1E illustrate simplified schematic views of the optical assembly 102 of the optical system 100, in accordance with one or more embodiments of the present disclosure. In particular, FIG. 1B depicts a top view of a single ring of illumination devices 106 of the optical assembly 102, in accordance with one or more embodiments of the present disclosure. In particular, FIG. 1C depicts a side view of the single ring optical assembly 102 of the optical system 100, in accordance with one or more embodiments of the present disclosure. In particular, FIG. 1D depicts a top view of a double ring 102 optical assembly 102 of the optical system 100, in accordance with one or more embodiments of the present disclosure. In particular, FIG. 1E depicts a side view of the double ring optical assembly 102 of the optical system 100, in accordance with one or more embodiments of the present disclosure.

In embodiments, the optical assembly 102 is configured to acquire one or more multi-modality focal stacks of a sample 120. For example, the optical assembly 102 may be configured to illuminate the sample 120 using two or more illumination modalities. For instance, the two or more illumination modalities may include at least a first illumination modality and a second illumination modality, where the first modality may include a first set of illumination angles and the second modality includes a second set of illumination angles. By way of another example, the first modality may include a first spectral distribution and a second spectral distribution, where the second spectral distribution may be at least partially different from the first. In this regard, the multi-modality focal stacks may include a plurality of images acquired at two or more distances between the front focal plane and the sample 120, where at least one image is acquired using the first modality and an additional image is acquired using the second modality, where the first modality and the second modality are at least partially different.

The optical assembly 102 may be positioned relative to the sample 120 mounted on a stage assembly 122. In embodiments, the sample may be heterogeneous, formed of two or more materials, where the first material is different from the at least a second material. For example, the heterogeneous sample may include a printed circuit board (PCB). The two or more materials may include, but are not limited to, copper, laminate, or the like.

The one or more imaging devices 104 of the optical assembly 102 may be configured to acquire one or more images of the sample 120 mounted on the stage assembly 122. For purposes of the present disclosure, the term "one or more imaging devices 104" refers to one or more imaging devices including an imaging sensor (e.g., a camera) and one or more optical elements (e.g., one or more lenses), unless otherwise noted herein.

The one or more imaging devices 104 may include any type of imaging device suitable for acquiring one or more two-dimensional (2D) images of the sample 120. For example, the one or more imaging devices 104 may include one or more cameras configured for image acquisition. For instance, the one or more imaging devices 104 may include one or more high-speed cameras configured for fast image acquisition (e.g., greater than the standard video rate of 24-25 frames per second (e.g., 90 frames per second)).

In embodiments, the one or more imaging devices 104 share a common axis with the sample 120 mounted on the stage assembly 122 when acquiring the one or more images. For example, the one or more imaging devices 104 may be positioned above at least a portion of the sample 120 mounted on the stage assembly 122 when acquiring the one or more images.

In embodiments, the optical assembly 102 further includes one or more actuation assemblies 107. The one or more actuation assemblies 107 may be configured to adjust a focal distance (i.e., the distance between the sample and the front focal plane) of the optical assembly 102 relative to the sample 120. For example, the one or more actuation assemblies may be configured to adjust a focal distance of the one or more imaging devices 104 by actuating the optical assembly 102 at least along the z-axis (common axis). By way of another example, the one or more actuation assemblies 107 may be configured to adjust a focal distance by actuating the sample 120 at least along the z-axis (common axis). For instance, the one or more actuation assemblies 107 may be configured to adjust the focal length of the one or more imaging devices 104, such that the focal distance between the one or more imaging devices 104 and the sample 120 may be adjusted. In this regard, the one or more imaging devices 104 may be configured to acquire two or more images of the sample at a set of two or more focal distances.

It is noted that the one or more actuation assemblies 107 may include any type of actuation device suitable for adjusting at least a focal distance of the optical assembly 102 relative to the sample 120. For example, the one or more actuation assemblies 107 may include, but are not limited to, one or more linear actuator devices. Further it is noted herein that the system 100 may be configured to adjust the focal distance of the optical assembly 102 relative to the sample 120 via any mechanism. As such, the above discussion shall not be construed as limiting the scope of the present disclosure. For example, the optical assembly 102 may include a variable focus lens configured to adjust the focal distance of the optical assembly 102 relative to the sample 120. By way of another example, one or more components of the optical assembly 102 may be actuated to adjust the focal distance of the optical assembly 102 relative to the sample 120. For instance, one or more imaging sensors may be actuated to adjust the focal distance of the optical assembly 102 relative to the sample 120.

In embodiments, the one or more imaging devices 104 may be configured to acquire the two or more images of the sample 120 at the set of distances while the one or more actuation assemblies are activated. For example, the two or more images of a sample 120 may be acquired during motion of the optical assembly 102 via the one or more actuation assemblies.

In embodiments, the one or more imaging devices 104 may be configured to acquire the two or more images of the sample 120 at the set of focal distances while the one or more actuation assemblies are at a fixed focal distance. For example, the two or more images of sample 120 may be acquired after the one or more actuation assemblies 124 have adjusted the focal distance of the one or more imaging devices 104 and are at one or more predetermined focal distances (or distances from the sample).

In embodiments, the one or more illumination devices 106 of the optical assembly 102 may be configured to generate one or more illumination beams 105. The one or more illumination devices 106 may include any suitable illumination device for generating one or more illumination beams 105. For example, the one or more illumination devices 106 may include one or more strobe illumination devices. For instance, the one or more strobe illumination devices may include, but are not limited to, one or more light emitting diodes (LEDs) (e.g., red LEDs), or the like. In this regard, the one or more strobe illumination devices may be configured to generate illumination for a short period of time to avoid blurring caused by movement/vibration (e.g., along the common axis or in the plane perpendicular to it). This enables fast acquisition by taking images while the distance between the sample and the front focal plane is being changed (e.g., by moving the imaging device 104).

The optical assembly 102 may further include one or more optical elements 126 configured to direct the one or more illumination beams to a surface of the sample 120. For example, the optical assembly 102 may include, but is not limited to, one or more mirrors, one or more lenses, one or more polarizers, one or more beam splitters, one or more optical fibers, and the like. It is noted that FIGS. 1B-1E are provided merely for illustrative purposes and shall not be construed as limiting the scope of the present disclosure. For example, the optical assembly 102 may include any type of optical elements and any configuration of optical elements.

In embodiments, the one or more illumination devices 106 may include a set of illumination devices 106 positioned at a set of illumination angles with respect to the sample 120. For example, the one or more illumination devices may include a set of illumination devices 106 including one or more high elevation illumination devices (e.g., positioned at a high elevation angle with respect to the stage/sample) and one or more low elevation illumination devices (e.g., positioned at a lower elevation angle with respect to the stage/sample than the high elevation device).

It is noted that the optical assembly 102 may include any number and configuration of illumination devices 106 suitable for illuminating the sample 120 at specified illumination angles (e.g., at several non-collinear illumination directions). FIGS. 1B-1E are provided merely for illustrative purposes and shall not be construed as limiting the scope of the present disclosure.

Each set of illumination devices 106 may be positioned proximate to the sample 120 mounted on the stage assembly 122. For example, each set of illumination devices 106a-106d may be positioned adjacent (or next to) the sample 120 mounted on the stage assembly.

Referring to FIGS. 1B-1E, the illumination devices 106 may be distributed evenly in the azimuth such that the illumination devices 106 are able to cover the range of illumination directions of the sample 120 substantially uniformly. For example, as shown in FIGS. 1B-1C, the illumination devices 106 may be distributed at equal angular intervals in a single ring configuration. In one instance, as shown in FIG. 1B, the set of illumination devices 106 may include six illumination devices separated by 60 degrees. By way of another example, as shown in FIGS. 1D-1E, the illumination devices 106 may be distributed evenly in a double ring configuration. In one instance, as shown in FIG. 1D, the set of illumination devices may include ten illumination devices, where a center ring includes four illumination devices separated by 90 degrees and an outer ring includes six illumination devices separated by 60 degrees.

Although FIG. 1B depicts the optical assembly 102 including seven illumination devices configured to illuminate the sample at seven distinct illumination angles, it is noted that the optical assembly 102 may include any number and configuration of illumination devices configured to illuminate the sample at any azimuthal and/or elevation illumination angle. For example, the set of illumination devices may include six illumination devices in a ring, separated by 60 degrees. Further, it is noted that the optical assembly 102 may be configured to illuminate the sample with any combination of illumination devices at one or more of the distinct illumination angles.

The system 100 may further include one or more prefabricated reference objects (or calibration targets). For example, the one or more prefabricated reference objects may include one or more fixed reference objects. By way of another example, the one or more prefabricated reference objects may include one or more removable reference objects.

The one or more reference objects may include one or more three-dimensional (3D) structures with known (or previously measured) depth maps. For example, the one or more known depth maps may be used for validation of one or more components of the optical assembly. By way of another example, the one or more known depth maps may be used for calibration of one or more components of the optical assembly. By way of another example, the one or more known depth maps may be used for retraining the machine learning algorithm. By way of another example, the one or more depth maps may be used for adjusting one or more inputs of the machine learning algorithm. For instance, the one or more depth maps may be used to correct the distances of each image, which may be adjusted following calibration.

In embodiments, the image processing subsystem 108 is configured to generate one or more depth maps of the sample 120 based on the acquired set of multi-modality focal stacks (including the one or more 2D images) from the optical assembly 102. For example, the image processing subsystem 108 may be configured to generate one or more depth maps of the sample 120 corresponding to the two or more 2D images of the focal stack using a machine learning algorithm 118 stored in memory 114 of the controller 110 of the image processing subsystem 108, as will be discussed further herein.

Figure 2A:
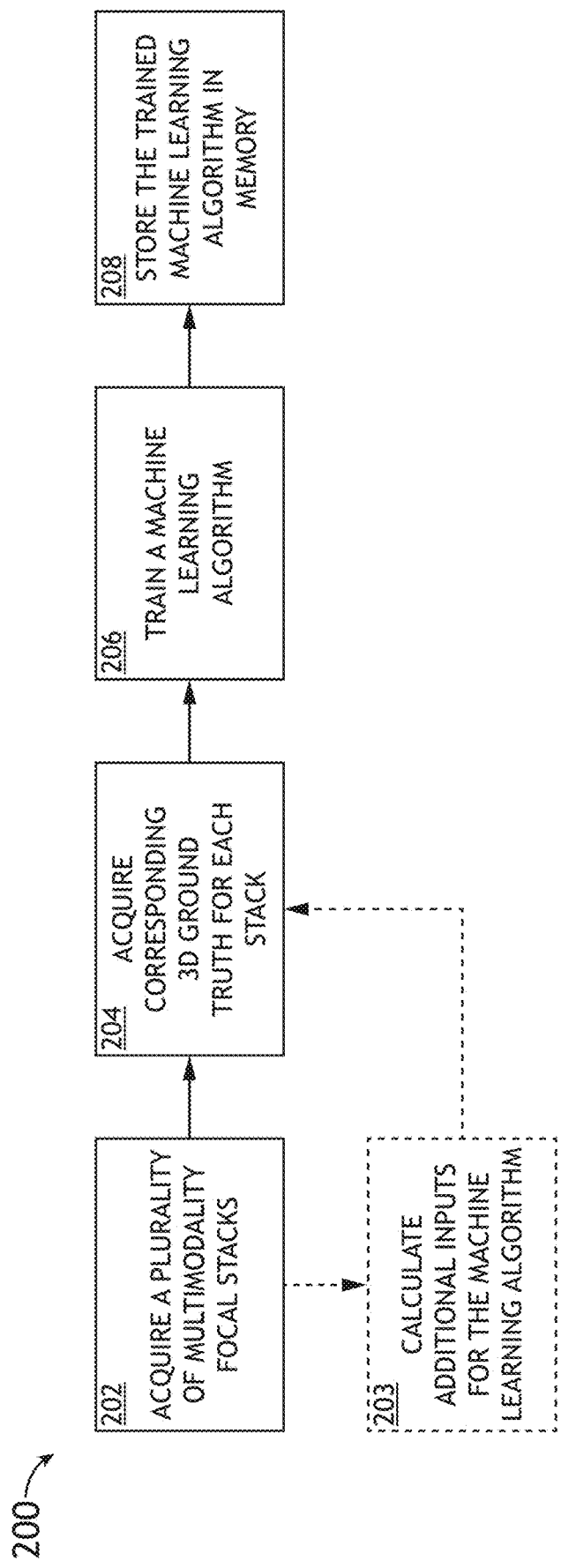
FIG. 2A illustrates a process flow diagram depicting a method of training a machine learning algorithm of the system, in accordance with one or more embodiments of the present disclosure.

FIG. 2A illustrates a process flow diagram 200 depicting a method of training a machine learning algorithm 118 of the system 100, in accordance with one or more embodiments of the present disclosure. It is noted that the process flow diagram 200 may be considered as a conceptual flowchart illustrating steps performed by/within the one or more processors 112 of the controller 110.

In a step 202, a set of training multi-modality focal stacks may be acquired. For example, the controller 110 of the image processing subsystem 108 may be configured to acquire from the optical assembly 102 a set of multi-modality focal stacks 101 used for training the machine learning algorithm 118.

In embodiments, each multi-modality focal stack 101 may include the one or more acquired images at each of a set of distances between the sample and the front focal plane and with two or more illumination angles in at least some of those distances, or with different illumination angles at different distances. For example, the one or more imaging devices 104 of the optical assembly 102 may be configured acquire the one or more images at a set of distances between the sample and the front focal plane while one or more of the illumination devices 106 are illuminating the sample 120 at one or more distinct illumination angles.

In an optional step 203, additional inputs to the machine learning algorithm may be calculated. The one or more additional inputs may include, but are not limited to, a depth map obtained from a single modality focal stack using a non-learning based algorithm, one or more post-processed images, one or more additional parameters, and the like. For example, the controller 110 may be configured to calculate one or more additional inputs to the machine learning algorithm using non-learning algorithms based on the acquired multi-modality focal stacks.

Figure 3:
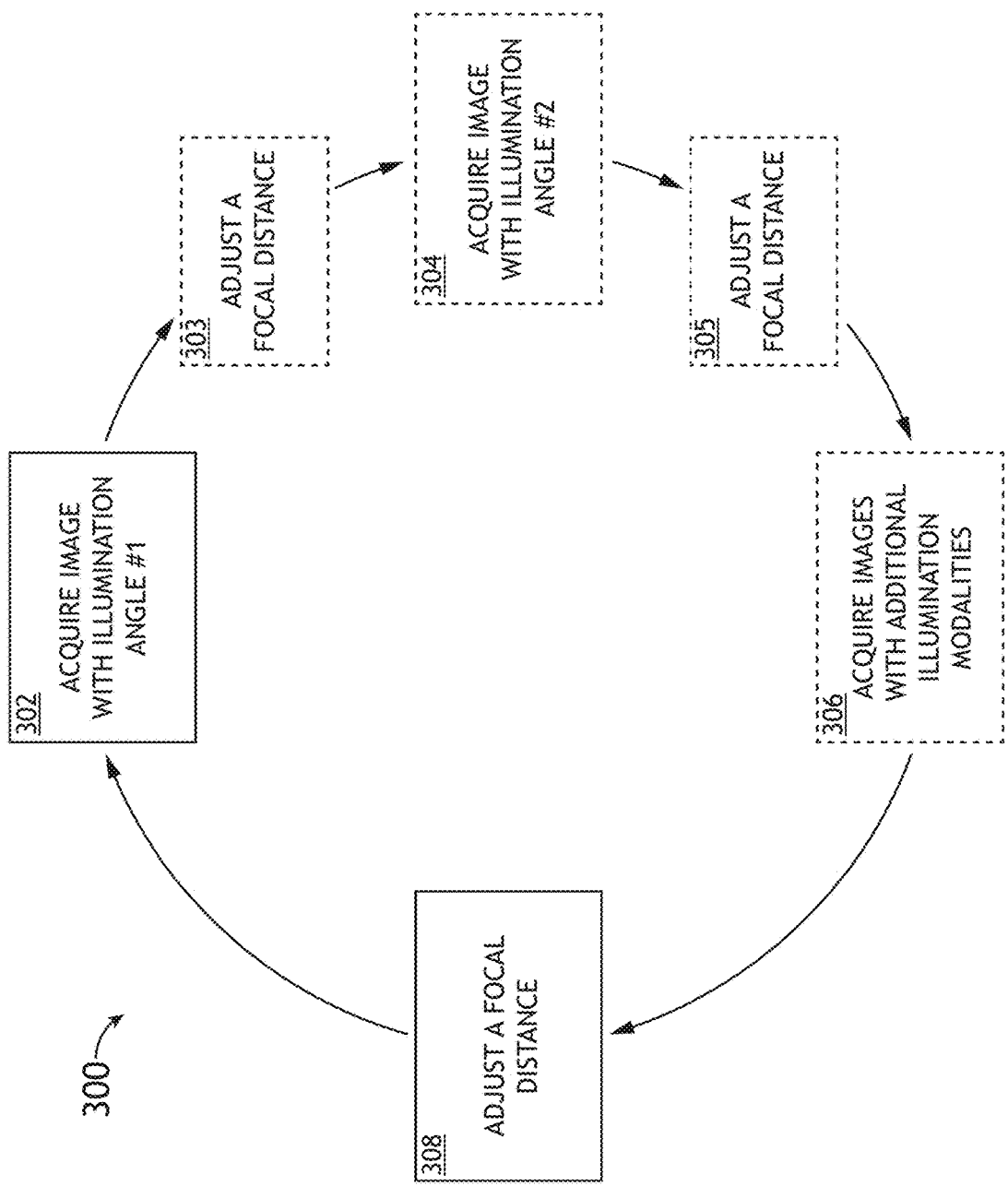
FIG. 3 illustrates a process flow diagram depicting a method of acquiring one or more focal stacks using one or more components of the system, in accordance with one or more embodiments of the present disclosure.

FIG. 3 illustrates a process flow diagram 300 depicting a method of acquiring one or more focal stacks using one or more components of the system 100, in accordance with one or more embodiments of the present disclosure. It is noted that the flow diagram 300 may be considered as a conceptual flowchart illustrating steps performed by/within the one or more processors 112 of the controller 110.

In a step 302, a first image with a first illumination modality having a first illumination angle (more generally, a specific range of illumination angles, which may partially overlap) may be acquired. For example, the one or more imaging devices 104 may be configured to acquire a first image at a first distance between the sample and the front focal plane while at least the first illumination device is illuminating the sample at least the first illumination angle.

For purposes of the present disclosure, "illumination modality" and variations thereof may be defined as a set of one or more illumination angles with the same or different spectral distributions for each angle.

In an optional step 303, a focal distance may be adjusted. For example, when acquiring images in motion, a focal distance may be adjusted between acquiring additional images at additional modalities.

In an optional step 304, a second image with a second illumination modality having a second illumination angle may be acquired. For example, the one or more imaging devices 104 may be configured to acquire a second image at a first distance between the sample and the front focal plane while at least the second illumination device is illuminating the substrate at least at the second illumination angle.

In an optional step 305, a focal distance may be adjusted. For example, when acquiring images in motion, a focal distance may be adjusted between acquiring additional images at additional modalities.

Figure 4:
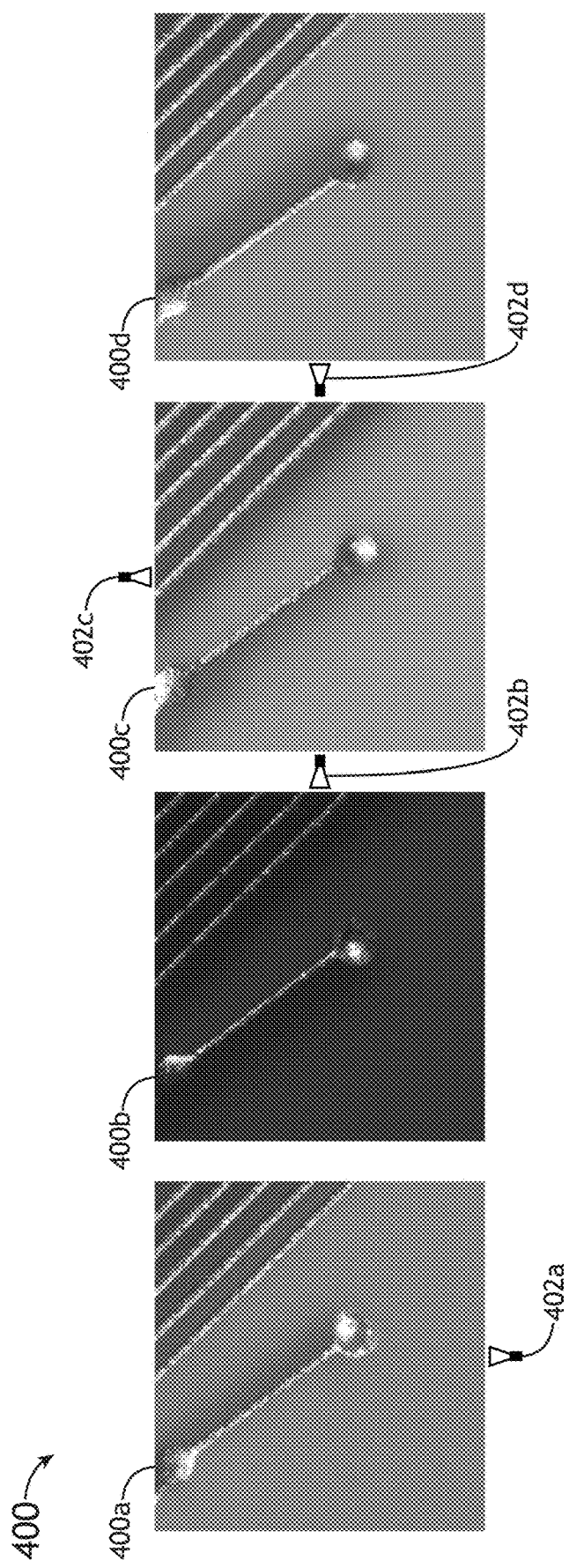
FIG. 4 illustrates focal stack images of a sample, in accordance with one or more embodiments of the present disclosure.
Figure 4:
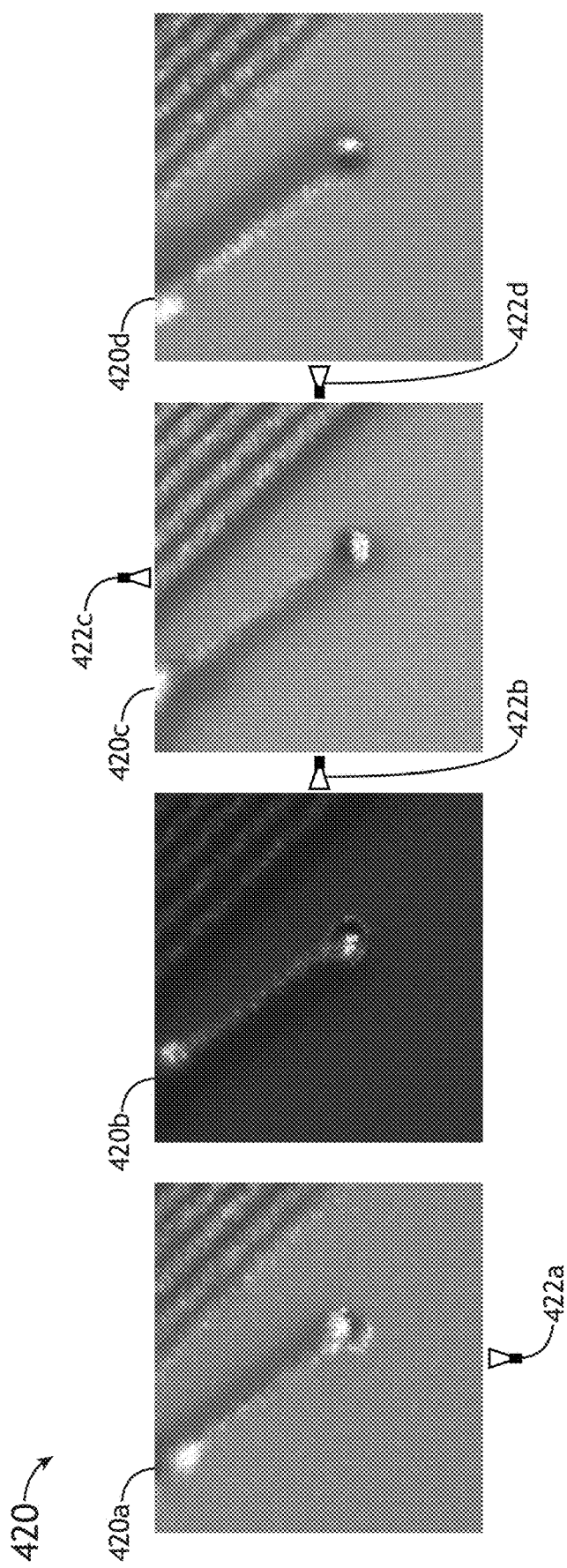

FIG. 4 illustrates example focal stack images, in accordance with one or more embodiments of the present disclosure. It is noted that both sets of images 400a-d, 420a-d may be part of a single focal stack, which may comprise additional images taken at additional focal distances and illumination angles.

Referring to FIG. 4, the first set of focal stack images 400 may include a plurality of images 400a-400d of a sample 120 (e.g., a PCB) taken at a first example focal distance. For example, the first set of focal stack images may include at least a first image 400a taken at the first example focal distance and at a first azimuth illumination direction 402a, where the image 400a is focused on the copper lines of the PCB. By way of another example, the first set of focal stack images may include at least a second image 400b taken at the first example focal distance and at a second azimuth illumination direction 402b, where the image 400b is focused on the copper lines of the PCB. By way of another example, the first set of focal stack images may include at least a third image 400c taken at the first example focal distance and at a third azimuth illumination direction 402c, where the image 400c is focused on the copper lines of the PCB. By way of another example, the first set of focal stack images may include at least a fourth image 400d taken at the first example focal distance and at a fourth azimuth illumination direction 402d, where the image 400d is focused on the copper lines of the PCB. Referring to FIG. 4 cont., the second set of focal stack images 420 may include a plurality of images 420a-420d of the sample 120 (e.g., a PCB) taken at a second example focal distance (different from the first example focal distance). For example, the second set of focal images may include at least a first image 420a taken at the second example focal distance and at a first azimuth illumination direction, where the image 420a is focused on the laminate of the PCB. By way of another example, the second set of focal images may include at least a second image 420b taken at the second example focal distance and at the second azimuth illumination direction, where the image 420b is focused on the laminate of the PCB. By way of another example, the second set of focal images may include at least a third image 420c taken at the second example focal distance and at the third azimuth illumination direction, where the image 420c is focused on the laminate of the PCB. By way of another example, the second set of focal images may include at least a fourth image 420d taken at the second example focal distance and at the fourth azimuth illumination direction, where the image 420d is focused on the laminate of the PCB.

Referring back to FIG. 3, in an optional step 306, one or more additional images with one or more additional illumination modalities may be acquired. For example, the one or more imaging devices 104 may be configured to acquire a third image at a first distance between the sample and the front focal plane while at least the third illumination device is illuminating the sample at at least the third illumination angle. By way of another example, the one or more imaging devices 104 may be configured to acquire a fourth image at a first distance between the sample and the front focal plane while at least the fourth illumination device is illuminating the sample at at least the fourth illumination angle. By way of another example, the one or more imaging devices 104 may be configured to acquire one or more images at the first distance between the sample and the front focal plane using one or more additional illumination spectra (e.g., different from those used for at least one of steps 302-306). It is noted that the illumination spectra may induce fluorescence of at least one of the two or more materials of the sample 120. For example, where the sample 120 is a PCB, the illumination spectra may induce fluorescence in the PCB laminate material.

In a step 308, a distance between the sample and the front focal plane of the optical assembly relative to the sample may be adjusted. For example, the actuation assembly may be configured to adjust a focal height of the optical assembly 102 relative to the sample 120.

It is noted that one or more steps of the method 300 (e.g., steps 302-306) may then be repeated at each of the one or more adjusted focal heights. For example, one or more of steps 302-306 may be repeated one or more times based on a predetermined height measurement range (e.g., distance between the optical assembly and the sample). For instance, the steps may be repeated every 0.5 μm to cover a distance between the front focal plane of the optical assembly and the sample of 25 μm on each side.

It is noted that the optical assembly 102 may be configured to perform continuous scanning of the focal distance. For example, during scanning, the distance between the sample and the front focal plane may be adjusted continuously and the one or more illumination devices may be preferably strobed in order to illuminate the sample while keeping the effective distance range between the sample and the front focal plane during each acquisition sufficiently small relative to the depth of field of the optical assembly, avoiding smearing of height information. The one or more imaging devices are preferably operative to acquire images of the sample as illuminated by the set of illumination modalities provided by the one or more illumination devices.

Referring back to FIG. 2A, in a step 204, 3D ground truth data for each focal stack of the set of multi-modality focal stacks (acquired in step 202) may be acquired. For example, the controller 110 of the image processing subsystem 108 may be configured to retrieve 3D ground truth data for each focal stack from a database stored in memory 114. By way of another example, the controller 110 of the image processing subsystem 108 may be configured to retrieve 3D ground truth data for each focal stack from a remote storage location (not shown).

Figure 5:
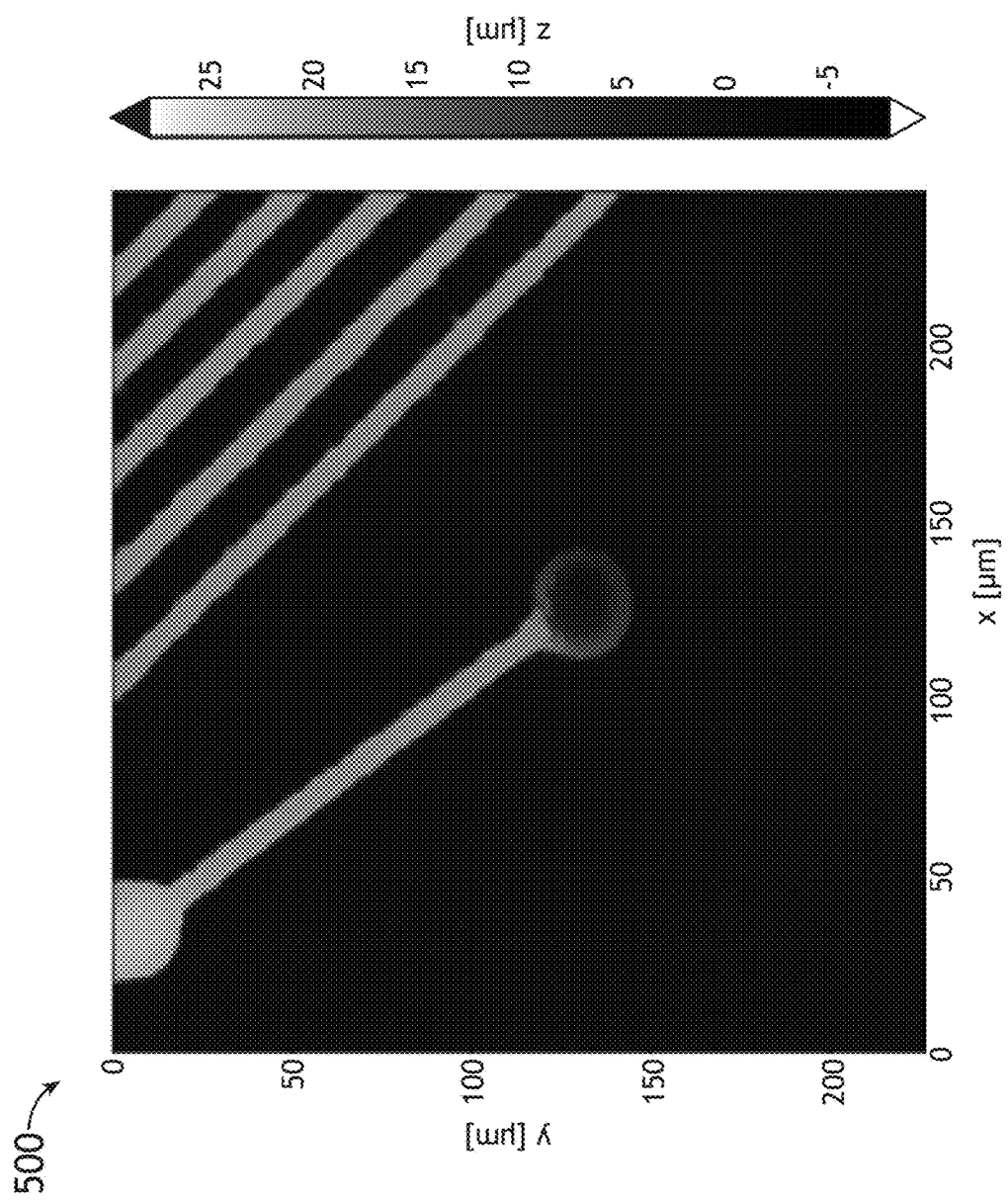
FIG. 5 illustrates a white light interferometry depth map of a sample, in accordance with one or more embodiments of the present disclosure.

In embodiments, as shown in FIG. 5, the 3D ground truth data may include one or more white light interferometry (WLI) depth maps. For example, the WLI depth map 500 may be obtained using WLI and may be used as ground truth for a multi-modality focal stack. For instance, the WLI depth map 500 may be obtained for a corresponding region on each multi-modality focal stack (such as that shown in FIGS. 4A-4B) and used as ground truth.

In a step 206, the machine learning algorithm may be trained based on the acquired set of training multi-modality focal stacks 101 and the received 3D ground truth data. For example, the controller 110 may be configured to train a machine learning algorithm based on the acquired set of training multi-modality focal stacks 101 and the received 3D ground truth data. For instance, the controller 110 may be configured to train a machine learning algorithm based on the acquired set of training multi-modality focal stacks 101 and the corresponding received WLI depth maps.

The controller 110 may be configured to train a machine learning algorithm via any technique known in the art including, but not limited to, supervised learning, and the like. For example, in the context of supervised learning, the training images may include a set of multi-modality focal stacks used to train the machine learning algorithm. In this regard, the controller 110 may receive training multi-modality focal stacks and ground truth data. Accordingly, the training focal stack and the ground truth 3D data (e.g., WLI depth maps) may be used as inputs to train the machine learning algorithm.

It is further noted herein that the machine learning algorithm trained in step 206 may include any type of machine learning algorithm and/or deep learning technique or algorithm known in the art including, but not limited to, a convolutional neural network (CNN), a Generative Adversarial Network (GAN), a modular neural network, a transformer, and the like. In this regard, the machine learning algorithm may include any algorithm or predictive model configured to generate one or more depth maps of the sample, as will be discussed in further detail herein.

Further, it is noted herein that the training described may also be performed on an external image processing system which is not a part of the optical system 100. As such, the trained machine learning algorithm may be provided to the controller 110 of the optical system 100 and used for generating the depth map (as discussed below with respect to step 216).

In a step 208, the trained machine learning algorithm may be stored. For example, the controller 110 may be further configured to store the training focal stacks, ground truth 3D data, and the trained machine learning algorithm 118 in memory 112.

Figure 2B:
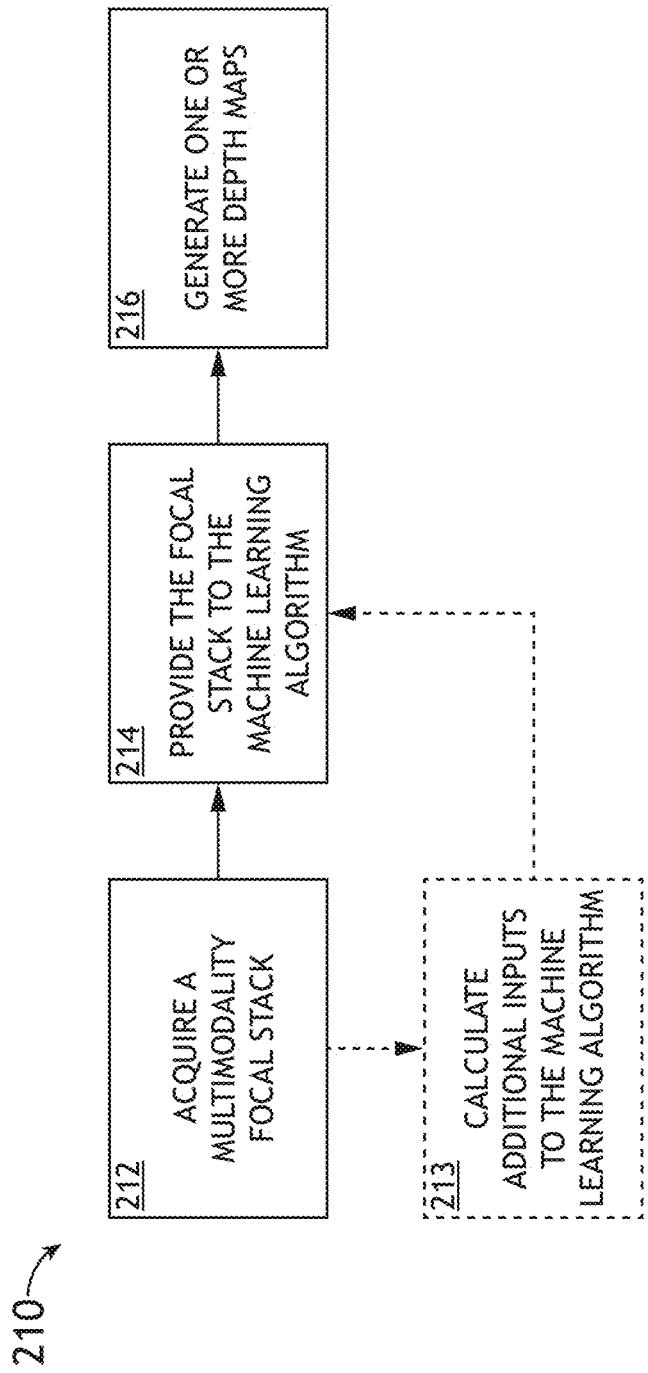
FIG. 2B illustrates a process flow diagram depicting a method of generating one or more depth maps using the trained machine learning algorithm of the system, in accordance with one or more embodiments of the present disclosure.

FIG. 2B illustrates a process flow diagram 210 depicting a method of generating one or more depth maps using the trained machine learning algorithm 118 of the system 100, in accordance with one or more embodiments of the present disclosure. It is noted that the process flow diagram 210 may be considered as a conceptual flowchart illustrating steps performed by/within the one or more processors 112 of the controller 110.

In a step 212, a set of product multi-modality focal stacks may be acquired. For example, the controller 110 may be configured to acquire a set of product multi-modality focal stacks of a product sample from the optical assembly 102. As it is used herein, the term "product images" or "product focal stacks" may be used to refer to images for which the one or more depth maps are to be generated. Thus, "product images" may be distinguished from "training images," which may be regarded as images which were used as inputs to train the machine learning algorithm used in the process described.

It is noted herein that any discussion regarding the acquisition of training images (as shown in flow diagram 300 of FIG. 3) may be regarded as applying to the acquisition of product images, unless noted otherwise herein. Accordingly, at least a first product image may be acquired at a first focal distance with at least a first illumination angle. Further, at least a second product image may be acquired at a first focal distance with at least one or more additional illumination angles. Optionally, at least one or more additional images may be acquired at the first focal distance with one or more illumination wavelengths. Additional images will then be acquired at one or more distances/illumination angles.

In an optional step 213, additional inputs to the machine learning algorithm may be calculated. The one or more additional inputs may include, but are not limited to, a depth map obtained from a single modality focal stack using a non-learning based algorithm, one or more post-processed images, one or more additional parameters, and the like. For example, the controller 110 may be configured to calculate one or more additional inputs to the machine learning algorithm using non-learning algorithms based on the acquired product multi-modality focal stacks.

In a step 214, the machine learning algorithm may receive the acquired set of product multi-modality focal stacks (and optionally, additional calculated inputs/parameters calculated in step 213). For example, the optical assembly 102 may be configured to provide the acquired focal stacks to the image processing sub-system 108.

In a step 216, one or more depth maps may be generated based on the acquired focal stacks 103 using the machine learning algorithm. For example, the image processing sub-system 108, via the machine learning algorithm, may be configured to generate one or more depth maps of the product sample based on acquired set of product multi-modality focal stacks 103. For instance, the machine learning algorithm 118 may be configured to generate one or more depth maps at one or more repair stages of an optical shaping system based on the acquired product images.

Although embodiments of the present disclosure are directed to an optical inspection and/or shaping system, it is contemplated that the system 100 may include any optical system known in the art. For example, embodiments of the present disclosure may be directed to an optical fabrication system.

It is further contemplated that each of the embodiments of the method described above may include any other step(s) of any other method(s) described herein. In addition, each of the embodiments of the method described above may be performed by any of the systems described herein.

Referring again to FIG. 1A, the one or more processors 112 may include any processing element known in the art. In this sense, the one or more processors 112 may include any microprocessor-type device (e.g., graphics processing unit (GPU), computer processing unit (CPU), and the like) configured to execute algorithms and/or instructions. In embodiments, the one or more processors 112 may consist of a desktop computer, mainframe computer system, workstation, image computer, parallel processor, or any other computer system (e.g., networked computer) configured to execute a program configured to operate the system 100, as described throughout the present disclosure. It is further recognized that the term "processor" may be broadly defined to encompass any device having one or more processing elements, which execute program instructions from a non-transitory memory medium 114. Therefore, the above description should not be interpreted as a limitation on the present invention but merely an illustration.

The memory medium 114 may include any storage medium known in the art suitable for storing program instructions executable and data by the associated one or more processors 112. By way of a non-limiting example, the memory medium 114 may include a non-transitory memory medium. By way of additional non-limiting examples, the memory medium 114 may include, but is not limited to, a read-only memory, a random access memory, a magnetic or optical memory device (e.g., disk), a magnetic tape, a solid state drive and the like. It is further noted that memory 114 may be housed in a common controller housing with the one or more processors 112. In an alternative embodiment, the memory 114 may be located remotely with respect to the physical location of the one or more processors 112 and controller. For instance, the one or more processors 112 of controller may access a remote memory (e.g., server), accessible through a network (e.g., internet, intranet and the like).

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An optical system, the optical system comprising:
   an optical assembly configured to illuminate one or more portions of one or more samples using two or more illumination modalities, wherein the two or more illumination modalities include at least a first illumination modality and a second illumination modality, the first illumination modality including a first set of illumination angles, the second illumination modality including a second set of illumination angles, wherein the second set of illumination angles is at least partially different from the first set of illumination angles,
   the optical assembly configured to acquire a multi-modality focal stack, the multi-modality focal stack including a plurality of images acquired at two or more distances between the one or more samples and a front focal plane, wherein at least a first image of the plurality of images is acquired using the first illumination modality and at least an additional image is acquired using the second illumination modality; and
   an image processing subsystem communicatively coupled to the optical assembly, the image processing subsystem including one or more processors configured to execute a set of program instructions stored in memory, the set of program instructions configured to cause the one or more processors to:
      receive a plurality of training images, the plurality of training images including a plurality of training multi-modality focal stacks;
      receive ground truth three-dimensional data for each training multi-modality focal stack of the plurality of training multi-modality focal stacks;
      train a machine learning algorithm based on the plurality of training images and the received ground truth three-dimensional data;
      receive the multi-modality focal stack of a sample from the optical assembly; and
      generate a depth map of the sample using the trained machine learning algorithm and the received multi-modality focal stack of the sample.

2. The system of claim 1, wherein the first illumination modality includes a first spectral distribution and the second illumination modality includes a second spectral distribution, wherein the second spectral distribution is at least partially different from the first spectral distribution.

3. The system of claim 1, wherein the optical assembly comprises:
   one or more illumination devices, the one or more illumination devices configured to illuminate the one or more samples at a plurality of illumination angles; and
   at least one imaging device arranged at a fixed direction relative to the one or more samples, the at least one imaging device configured to acquire at least a first image of the one or more samples with a first illumination angle of the plurality of illumination angles and acquire at least a second image of the one or more samples with a second illumination angle of the plurality of illumination angles.

4. The system of claim 3, further comprising:
   one or more actuation assemblies configured to adjust at least a distance between the one or more samples and the front focal plane of the optical assembly, wherein the at least one imaging device may be configured to acquire the one or more images at two or more distances between the one or more samples and the front focal plane.

5. The system of claim 4, wherein the adjust at least a distance between the one or more samples and the front focal plane of the optical assembly includes at least one of:
   adjusting a position of the optical assembly or adjusting a position of the one or more samples.

6. The system of claim 3, wherein the one or more processors are further configured to one of adjust a position of the at least one imaging device or adjust one or more optical properties of one of the at least one imaging device or the optical assembly.

7. The system of claim 1, wherein the one or more processors are further configured to:
   receive one or more additional inputs for the machine learning algorithm, the one or more additional inputs including one of one or more depth maps obtained from the multi-modality focal stack using a non-learning based algorithm, one or more post-processed images from the multi-modality focal stack, or one or more additional parameters.

8. The system of claim 1, wherein the ground truth data includes one or more white light interferometry depth maps.

9. The system of claim 1, wherein the machine learning algorithm comprises at least one of:
a Convolutional Neural Network, a Generative Adversarial Network, a Modular Neural Network, or a transformer.

10. The system of claim 1, further comprising:
one or more prefabricated reference objects, the one or more prefabricated reference objects including one or more three-dimensional structures with one or more known depth maps, the one or more known depth maps configured to be used for at least one of validation of the optical assembly, calibration of the optical assembly, correction of the multi-modality focal stack, or retraining of the machine learning algorithm.

11. The system of claim 1, wherein the sample includes a printed circuit board.

12. The system of claim 1, wherein the optical system comprises an automated optical inspection system.

13. The system of claim 1, wherein the optical system comprises an automated optical shaping system.

14. An image processing system, the image processing system comprising:
one or more processors configured to execute a set of program instructions stored in memory, the set of program instructions configured to cause the one or more processors to:
receive a plurality of training images of one or more portions of one or more samples, the plurality of training images including a plurality of training multi-modality focal stacks;
receive ground truth three-dimensional data for each training multi-modality focal stack of the plurality of training multi-modality focal stacks;
train a machine learning algorithm based on the plurality of training images and the received ground truth three-dimensional data;
receive a multi-modality focal stack of a sample from an optical assembly, the optical assembly configured to illuminate the one or more portions of the sample using two or more illumination modalities, wherein the two or more illumination modalities include at least a first illumination modality and a second illumination modality, the first illumination modality including a first set of illumination angles, the second illumination modality including a second set of illumination angles, at least the second set of illumination angles is at least partially different from the first set of illumination angles, the multi-modality focal stack including a plurality of images acquired at two or more distances between the sample and a front focal plane, wherein at least a first image of the plurality of images is acquired using the first illumination modality and at least an additional image is acquired using the second illumination modality; and
generate a depth map of the sample using the trained machine learning algorithm and the received multi-modality focal stack.

15. The system of claim 14, wherein the first illumination modality includes a first spectral distribution and the second illumination modality includes a second spectral distribution, wherein the second spectral distribution is at least partially different from the first spectral distribution.

16. The system of claim 14, further comprising:
an optical assembly configured to acquire the multi-modality focal stacks.

17. The system of claim 16, wherein the optical assembly comprises:
one or more illumination devices, the one or more illumination devices configured to illuminate the sample at a plurality of illumination angles; and
at least one imaging device arranged at a fixed direction relative to the sample, the at least one imaging device configured to acquire at least a first image of the sample with a first illumination angle of the plurality of illumination angles and acquire at least a second image of the sample with a second illumination angle of the plurality of illumination angles.

18. The system of claim 17, wherein the optical assembly further comprises:
one or more actuation assemblies configured to adjust at least a distance between the sample and the front focal plane of the optical assembly, wherein the at least one imaging device may be configured to acquire the two or more images at the two or more distances between the sample and the front focal plane.

19. The system of claim 18, wherein the adjust at least a distance between the sample and the front focal plane of the optical assembly includes at least one of:
adjusting a position of the optical assembly or adjusting a position of the sample.

20. The system of claim 17, wherein the one or more processors are further configured to one of adjust a position of the at least one imaging device or adjust one or more optical properties of one of the at least one imaging device or the optical assembly.

21. The system of claim 14, wherein the one or more processors are further configured to:
receive one or more additional inputs for the machine learning algorithm, the one or more additional inputs including one of one or more depth maps obtained from the multi-modality focal stack using a non-learning based algorithm, one or more post-processed images from the multi-modality focal stack, or one or more additional parameters.

22. The system of claim 14, wherein the ground truth data includes one or more white light interferometry depth maps.

23. The system of claim 14, wherein the machine learning algorithm comprises at least one of:
a Convolutional Neural Network, a Generative Adversarial Network, a Modular Neural Network, or a transformer.

24. The system of claim 14, wherein the sample includes a printed circuit board.

25. A method, the method comprising:
receiving a plurality of training images of one or more portions of one or more samples, the plurality of training images including a plurality of training multi-modality focal stacks;
receiving ground truth three-dimensional data for each training multi-modality focal stack of the plurality of training multi-modality focal stacks;
training a machine learning algorithm based on the plurality of training images and the received ground truth three-dimensional data;
receiving a multi-modality focal stack of the one or more samples from an optical assembly, the optical assembly configured to illuminate the one or more samples using two or more illumination modalities, wherein the two or more illumination modalities include at least a first illumination modality and a second illumination modality, the first illumination modality including a first set of illumination angles, the second illumination modality including a second set of illumination angles, at least the second set of illumination angles is at least partially different from the first set of illumination angles, the multi-modality focal stack including a plurality of images acquired at two or more distances between the sample and a front focal plane, wherein at least a first image of the plurality of images is acquired using the first illumination modality and at least an additional image is acquired using the second illumination modality; and generating a depth map of the one or more samples using the trained machine learning algorithm and the received multi-modality focal stack.

\* \* \* \* \*